July 12, 1938.　　　　P. WORMSER　　　　2,123,644
FRUIT PITTING METHOD
Filed June 15, 1936
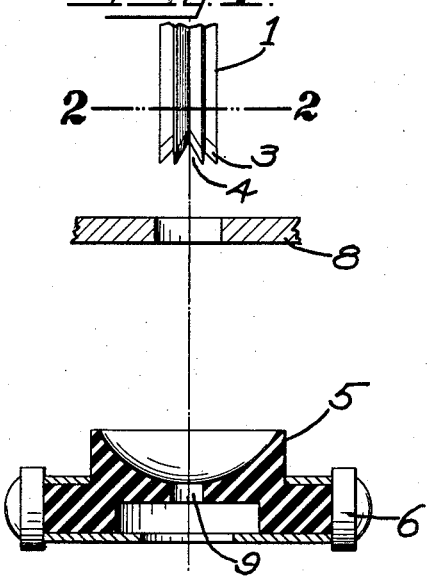
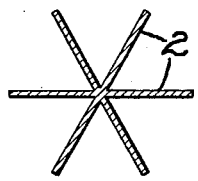
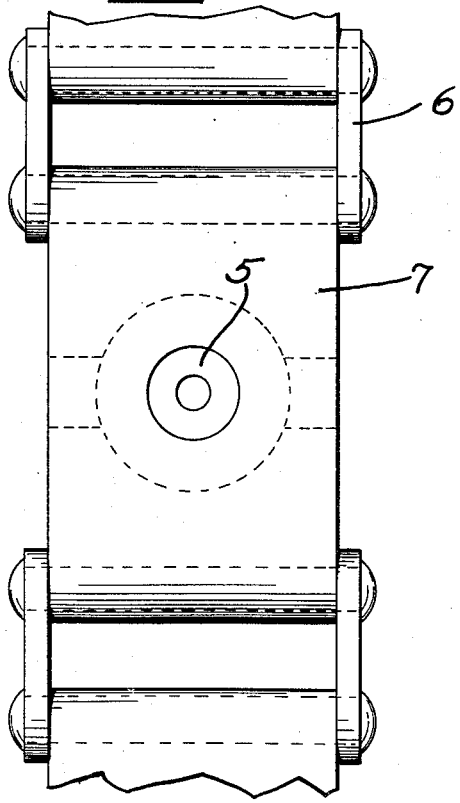
INVENTOR,
PAUL WORMSER.
BY
Lippincott & Metcalf
ATTORNEYS.

Patented July 12, 1938

2,123,644

UNITED STATES PATENT OFFICE 2,123,644

FRUIT PITTING METHOD

Paul Wormser, San Francisco, Calif., assignor to Sussman, Wormser & Co., San Francisco, Calif., a corporation of California Application June 15, 1936, Serial No. 85,185

2 Claims. (Cl. 146—219)

My invention relates to the pitting of stone fruit such as cherries or plums, and especially to the pitting of such fruit which has previously been preserved in an aqueous solution in order to enable the same to be kept in proper condition in the interim between picking and canning or other processing. The treatment with the preserving solution may have preceded the further processing by weeks, or even months, the fruit having been retained in barrels or the like for transit.

In the usual practice of machine pitting such fruits, to which my invention relates, the fruit is placed in a centering cup of soft rubber, which is provided with a central perforation at the bottom thereof through which the pit may be forced. A knife is then brought down upon the fruit, such knife being formed with a recess in the end thereof intended to surround the pit and force it through the flesh of the fruit and out through the perforation in the rubber cup, the cup during the passage of the knife furnishing a backing for the fruit.

It has been the common experience in pitting by the above outlined method to find that a small percentage of pits will not be removed, and some will be cracked and left in the fruit. Obviously it is difficult to detect such failures, and such pitted fruits in bulk are consequently retentive of a small number of pits both cracked and whole which render the fruit objectionable to the consumer.

It is the principal object of my invention to provide an improved method of pitting small fruits, which method insures the removal of all pits.

It is another object of my invention to provide a method of lubricating stone fruits during a pitting operation to insure a minimum of missed pits.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Figure 1 is a view in somewhat diagrammatic form, showing the relative position of pitting stage parts of a fruit pitting machine;

Figure 2 is a sectional view taken on the line 2—2 of the pitter knife; and

Figure 3 is a fragmentary plan view of a carrier for the fruit receptacles.

In Figure 1 there is shown more or less diagrammatically the principal elements of a stone fruit pitting machine, which comprises a vertically reciprocating knife 1, having a plurality of radiating blades 2 terminating with beveled terminal edges 3 cut to form a knife recess 4.

Disposed for operative relation with the knife is a soft rubber cup 5, suitably mounted in a chain carrier plate which is drawn into operative relation with the knife by suitable sprocket arrangements. The chain 6 comprises a plurality of plates 7, carrying a plurality of cups 5. The knife approaches the cup through stripper plate 8.

As indicated, the cups are spherically concave and provide a small opening 9 in the bottom thereof. In operation a cherry or like fruit taken from a preserving solution such as an aqueous solution of calcium bisulphite plus natural sugars is placed in the cup and moved beneath the knife. The knife is then brought down and the recess 4 of the blade is intended to encompass the pit and force it through the remaining flesh of the cherry at the stem end and out through cup opening 9 to be collected as a pitted fruit.

It has been found that with an arrangement of the above described character, a small percentage of fruit treated contained crushed or whole pits. Apparently such fruits as were not successfully pitted were not properly alined with the knife to permit the pit to be fully received in the recess 4, and thereby insure its movement through the opening 5.

I have discovered that all the fruits placed in the machine will have their pits effectively removed if the cups be doubly lubricated during or prior to the placing of the fruits therein. This may be done by flooding the cups with water, but is preferably accomplished by depositing a very small quantity of edible oil such as cottonseed oil, corn oil, or liquid petrolatum in the cup, by spraying, brushing or otherwise, before the fruit is placed therein.

I do not wish to be bound by the following explanation, for I have not found it possible to fully observe the action of these machines because of the rapidity with which normal pitting is performed, but I believe that the addition of the oil on the cup surfaces permits the blade 1 to rotate or cam the entire fruit into proper alinement with the opening 9, even though the pit is considerably out of the axis line at the time the blade engages the pit.

It should be here pointed out that the fruits, as received at the pitting machine, are wetted with their preserving solution and are very slippery to the touch. It would therefore be assumed that because of this slippery condition they would, especially on the rubber surface of the cup, rotate with a minimum of friction, particularly as the rubber also seems slippery when wetted with the solution and as water is generally employed as the lubricant with rubber. It appears possible that with the two different lubricants the actual slippage occurs on the contact between the two liquids, and that this accounts for the greatly improved results.

When the wet fruits are merely placed in the cups without additional lubrication, however, about the best consistent result obtainable, with any shape of knife or cup, is about 98%–85%, i. e., in pitting cherries there will be about twenty per thousand of those passing the machine which have whole pits, and about one hundred and thirty more which have fragments or chips of pits left in them.

Flooding the cups with clear water in addition to the brine lubrication gives a vastly better result, no whole pits being left in test runs of one barrel (about twenty-two thousand cherries), and only from seven to ten fragmentary pits.

The use of the oil lubricant improves the performance still further; similar test runs show, on the average, only one fragmentary pit and no whole pits, a decrease of failures to less than 1/3000 of those where the lubricant is not used. As a result of the negligible percentage of failures, fruits pitted by my method are a commercially salable product, while those machine pitted by ordinary methods are not, since the higher inspection costs outweigh the advantages of machine pitting.

Since only edible oils are used, and the amounts are very small, no deleterious effects are produced even if the oil be carried over into the finished product. In general, however, the additional cooking, flavoring or other processes will completely remove any adherent oil, or, if not, an additional washing process may be introduced at much less than the cost of hand pitting or individual inspection.

I claim:

1. In the pitting of fruits by a mechanical method wherein the fruit to be pitted is placed in a rubber cup having a substantially central opening and the pit is forced through the flesh of the fruit by a knife penetrating the opposite side thereof and out through an opening in the cup, the steps in the method which comprise positioning the fruit in the cup while wet with a processing solution and adding an oily substance between said cup and the wet fruit in addition to any processing solution which may adhere to the fruit, and pitting the fruit while it is wetted and lubricated with said oily substance.

2. In the pitting of fruits by a mechanical method wherein the fruit to be pitted is placed in a rubber cup having a substantially central opening and the pit is forced through the flesh of the fruit by a knife penetrating the opposite side thereof and out through an opening in the cup, the steps in the method which comprise positioning the fruit in the cup while wet with a processing solution and adding an edible oil substance between said cup and the wet fruit in addition to any processing solution which may adhere to the fruit, and pitting the fruit while it is wetted and lubricated with said edible oil.

PAUL WORMSER.